(No Model.)
J. N. STEVENS.
FILTER.
No. 265,177. Patented Sept. 26, 1882.
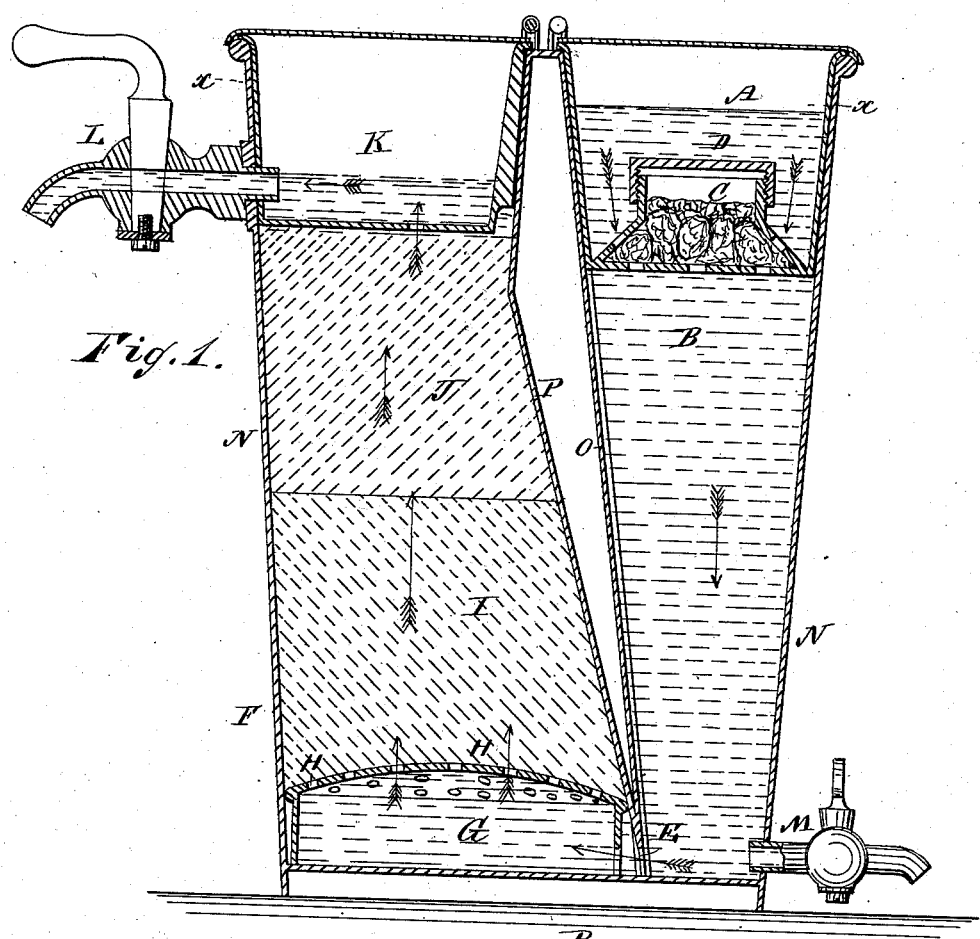
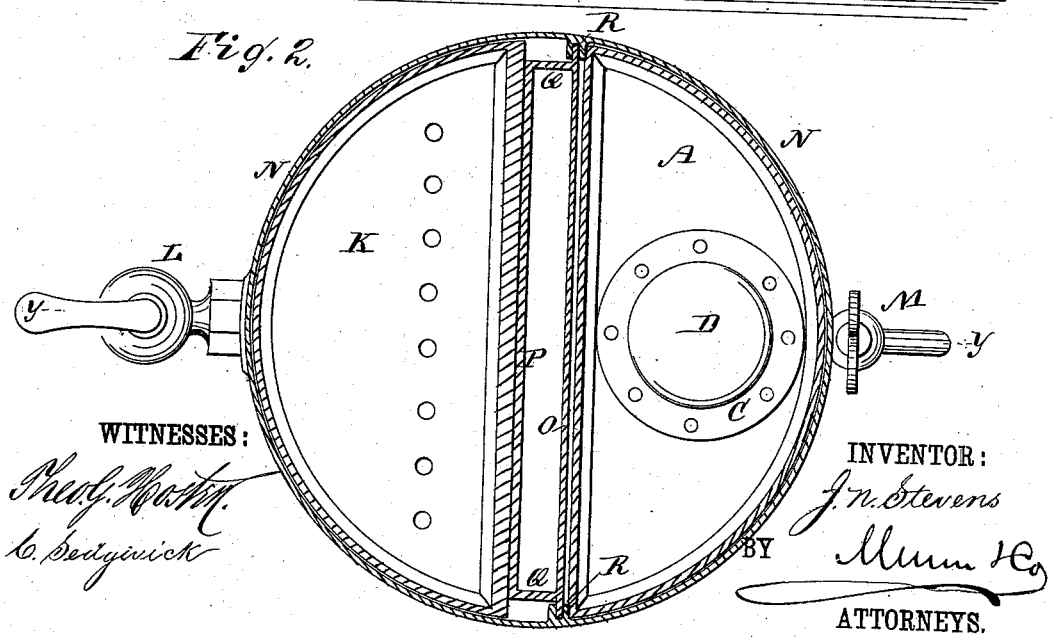
WITNESSES:
INVENTOR:
J. N. Stevens
BY
ATTORNEYS.

UNITED STATES PATENT OFFICE.

JOHN N. STEVENS, OF TOLEDO, OHIO.

FILTER.

SPECIFICATION forming part of Letters Patent No. 265,177, dated September 26, 1882.

Application filed April 8, 1882. (No model.)

*To all whom it may concern:*

Be it known that I, JOHN N. STEVENS, of Toledo, in the county of Lucas and State of Ohio, have invented certain new and useful Improvements in Filters, of which the following is a full, clear, and exact description.

This invention consists of an improved construction of filters, designed to facilitate the settling of the matters contained in the water into a mud-space before the water enters the filtering material; also, to facilitate the cleaning of the mud-drum and the filtering material at the same time by causing water to flow back through the filtering material from the clear-water pan into the mud-space under the filtering material, and thence directly out through a discharge-passage in a manner calculated to efficiently cleanse the filter, all as hereinafter more fully described.

Reference is to be had to the accompanying drawings, forming part of this specification, in which similar letters of reference indicate corresponding parts in both the figures.

Figure 1 is a sectional elevation of my improved filter, taken on line $y\ y$ of Fig. 2; and Fig. 2 is a horizontal section of Fig. 1, taken on the line $x\ x$.

A represents a pan in the top of another deeper pan, B, to receive the water, and being readily removable therefrom, in which there is a sponge-case, C, for the water to pass through on its way to pan B, said sponge-case being provided with a removable cap, D, for opening it to cleanse the sponge from time to time. The sponge separates the larger particles of matter, and is located in the shallow pan A, near the top of the filter, where it can be readily removed frequently to be cleaned. At the bottom of deep pan B the water passes laterally from said bottom through passage E into the bottom of another pan, F, equal in depth to pan B, in the bottom of which is a mud drum or chamber, G, partitioned from the space above by the perforated plate H, which in this case is slightly conical, but may be flat or concave, as preferred.

Over the mud-chamber G the filter is located, said filter consisting of a bottom layer, I, of gravel, and a top layer of charcoal, J, over which the clear-water pan K is placed to receive the water through its perforated bottom, and provided with a faucet, L, for drawing off the water. Pan K is also removable for discharging and renewing the filtering material when required.

M is a faucet at the bottom of pan B, back of the passage from said pan into the mud-drum, for the escape of the wash back through the filtering material and the mud-drum G.

The essential feature of this improved filter is the mud-drum G, located under the filter I J, where the water will be largely freed of sediment by settling down on the bottom without entering the filter at all, while that which does enter it will be separated at the bottom of the filter, where it will wash back into the mud-drum G and out through faucet M whenever water is poured into pan K and faucet M is opened and L closed. It will be seen that the arrangement is calculated to have the best effects; also, that the filter will not often require renewal of the filtering material; also, that it can be washed out with very little trouble; also, that the parts can be readily taken out for cleaning or repairs, and can be as readily replaced, and also that the construction is simple.

For the filter I prefer to use an ordinary round tapered can, N, partitioned at O to separate the interior into two spaces, before described as pans B and F, the partition being made with a back, P, and sides Q for stiffening it, and applied in the grooved ribs R, attached to the interior of the can.

The mud-drum may consist of an inverted cup placed in the bottom of pan F, with its bottom forming the partition H, the said cup being fitted tightly around the edge of said partition H to prevent the escape of water, except through the perforations, also to prevent the filtering material from falling down; but I do not limit myself to the particular construction shown, nor to the material used, which may be sheet metal, earthenware, or other approved material.

Having thus fully described my invention, I claim as new and desire to secure by Letters Patent—

1. In a filter, the combination of a can or other portable vessel provided with a vertical partition separating it into two apartments, yet allowing water to pass under or through the partition, near its bottom, a mud-drum in the bottom of one of the apartments, provided with openings to allow water to pass from the partition through its side and out at its top, filtering material over the mud-drum, and a faucet or suitable device for drawing the filtered water from above the filtering material, as shown and described.

2. The combination, with the can or vessel N, having guides R, of the partition O, fitted to slide in said guides, and perforated near its lower end, and filtering material I J in one compartment of the can, above said holes in the partition, as shown and described.

3. The combination, with the can or vessel N, having guides R, the partition O, and filtering material I J, of the re-enforcement to the partition, consisting of the sides Q and back P, as shown and described.

4. The combination, with the vessel N, the movable partition O, having holes through its lower part, and the filtering material I J, of the movable disk G, perforated through its bottom and one side, and inverted in the vessel N, as shown and described.

5. The combination of the vessel N, perforated partition O, mud-drum G, filtering material I J, and faucets L and M, as shown and described.

6. The combination, with the filtering apparatus N O G I J, of a preparatory or auxiliary filter consisting of the perforated dish A, sponge C, and cap D, as and for the purpose specified.

JOHN N. STEVENS.

Witnesses:
 FREDERICK L. GEDDES,
 RICHARD T. HOSKIN.